HARVEY F. PHIPARD JR.
INVENTOR

BY
BUCKHORN, BLORE, KLARQUIST & SPARKMAN
ATTORNEYS

July 8, 1969  H. F. PHIPARD, JR  3,454,070
DIFFERENTIAL PITCH FASTENER DEVICE
Filed Oct. 10, 1967  Sheet 2 of 3
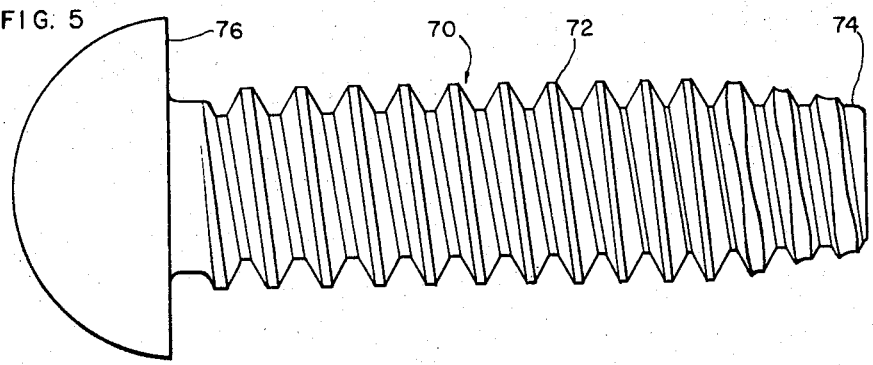
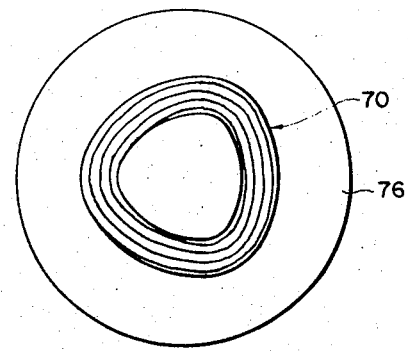
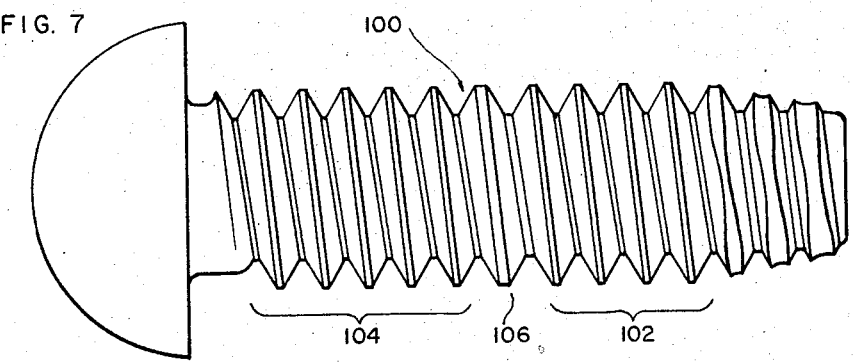
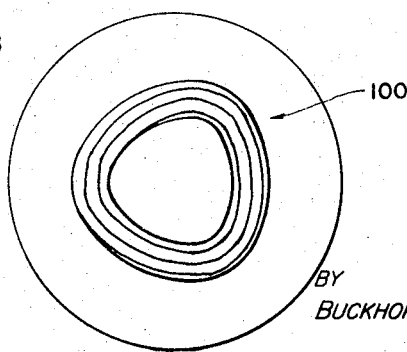
HARVEY F. PHIPARD JR.
INVENTOR
BY
BUCKHORN, BLORE, KLARQUIST & SPARKMAN
ATTORNEYS

HARVEY F. PHIPARD JR.
INVENTOR

BY
BUCKHORN, BLORE, KLARQUIST & SPARKMAN
ATTORNEYS

United States Patent Office 3,454,070
Patented July 8, 1969

3,454,070
DIFFERENTIAL PITCH FASTENER DEVICE
Harvey F. Phipard, Jr., South Dartmouth, Mass., assignor to Research Engineering & Manufacturing, Inc., New Bedford, Mass., a corporation of Massachusetts
Filed Oct. 10, 1967, Ser. No. 674,194
Int. Cl. F16b 25/00, 39/02
U.S. Cl. 151—22  1 Claim

ABSTRACT OF THE DISCLOSURE

A fastener device is provided with a thread having other than a constant pitch whereby such fastener device may engage a threaded female member in locking relation. For example, the thread pitch can be different at two separate locations along the fastener device such that when the fastener device engages a female thread, the flanks of the fastener thread at the two separate locations are urged in opposite directions upon the female thread to lock the male and female threads together. In order to fully seat the fastener device without causing stripping of threads as the fastener device is driven into a female member of hardness comparable to the fastener device, the fastener device according to the present invention is provided with a cross section of arcuate, polygonal configuration including circumferentially spaced-apart lobes having sloping sides. Each of these lobes exercises a limited swaging or reforming action on the female thread whereby stripping is prevented, and driving torque is reduced.

Background of the invention

It has heretofore been proposed to provide locking between cooperatively threaded members by forming the thread of a male member so as to produce interference with the thread of a female member as the two are driven together. One such proposal suggests provision of a male member with a thread of one pitch at the work-entering end which merges with a thread continuation of a slightly different pitch on the shank. Stienle U.S. Patent 2,356,098 describes such a thread for use on one end of a stud which is to be driven into a previously threaded hole in an aluminum crankcase whereby the stud is locked into the aluminum body so securely that the nut screwed onto the other end of the stud may be removed from time to time without also removing the stud.

A difficulty exists in using such a thread on a conventional screw for engaging a conventional female member formed of steel or the like for the reason that as the interfering threads commence engagement, the frictional resistance, which in the case of a round screw occurs throughout 360°, builds up very rapidly to a value of approaching the stripping strength of the threads or the failure torque of the screw. The safe limit torque with which such a screw may be driven may or may not coincide with the point at which the screw is completely driven home, or with the point at which a desired degree of compression is reached with respect to a member assembled between the screw head and the engaged female member. Frequently a loose assembly results, and if it is attempted to apply further torque to the screw, the mating threads are stripped or the screw may be sheared in two.

This problem is particularly bothersome in assembly lines when it is attempted to use a power driver equipped with an automatic clutch. As is well known, automatic clutches cannot be relied upon to disengage each time at a precise value of torque. For this reason, it is not feasible to use screws with power drivers, in which the applied torque closely approximates the failure torque of the screw, or the stripping torque of the interengaged threads. When applied to a screw of changing pitch, a power driver may strip the screw thread rather than stopping short at just the right amount of torque for securing the assembly. What is desired, therefore, is a screw which can be driven into a part provided with preformed matching threads for securely clamping the two parts tightly together with an applied driving torque which is well below the failure torque of the screw or mating threads.

Summary of the invention

In accordance with the present invention, an interfering thread is provided upon a fastener device or screw of such cross-sectional shape that frictional engagement between the threads is reduced to a very low value, and driving torque is also reduced to such a low value that a high differential exists between the driving torque of the screw and the failure torque of the threads or the failure torque of the screw itself, even with the interfering threads in full engagement. Thus it is entirely feasible to drive screws of the present invention to a fully seated position for tightly clamping two members together, e.g. employing a power driver, without risk of screw failure or stripping of threads, while so interlocking the threads that the fastener device is not likely to shake loose even under the most severe operating conditions.

According to a preferred embodiment of the present invention, a first threaded portion of the fastener device is displaced with respect to a constant pitch helix extension of thread on another portion, e.g., the threads at two spaced-apart portions may have different pitches, to produce locking with the thread of a female member. The cross section of the fastener device is of arcuate, polygonal configuration including circumferentially spaced-apart lobes having sloping sides. In threaded regions of changing pitch each of these lobes is displaced only slightly in pitch position from the next adjacent lobe, and each lobe, therefore, exercises a limited swaging or reforming action on the female thread whereby to reform the female thread and produce locking with low driving torque.

It is accordingly an object of the present invention to provide an improved, easily driven fastener device for engaging a workpiece or threaded member in locking relation.

It is another object of the present invention to provide an improved tapping fastener device capable of locking into a thread tapped thereby.

It is another object of the present invention to provide an improved fastener device which may be initially easily engaged with a workpiece or matching thread and then locked into place to a desired extent with substantially minimized likelihood of thread stripping or device failure.

It is a further object of the present invention to provide an improved fastener device having low driving torque and which may be conveniently driven home with a power driver or the like to provide a locking connection with an engaged member.

The subject matter which I regard as my invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements.

Drawings

FIG. 1 is a side view of a fastener device according to a first embodiment of the present invention;
FIG. 2 is an end view of the FIG. 1 device;
FIG. 3 is a side view of a second embodiment of a fastener device according to the present invention;
FIG. 4 is an end view of the FIG. 3 device;

FIG. 5 is a side view of another embodiment of a fastener device according to the present invention;

FIG. 6 is an end view of the FIG. 5 device;

FIG. 7 is a side view of still another embodiment of a fastener device according to the present invention;

FIG. 8 is an end view of the FIG. 7 device;

*Detailed description*

Figure 1:
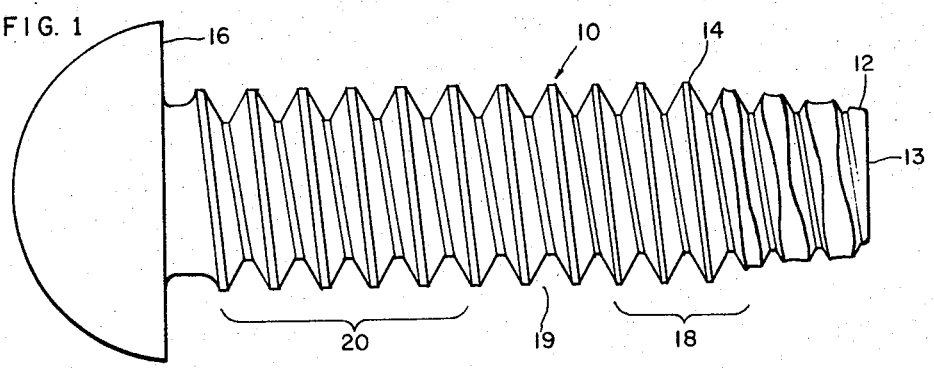

Referring to FIG. 1, a fastener device 10 according to the present invention is desirably formed of steel and includes a shank 12 provided with a substantially continuous thread 14. A head 16 is suitably upset on one end thereof. The thread 14 includes a forward or work-entering portion 18 and a rearward portion 20 longitudinally removed toward the head from the work-entering portion. In this particular embodiment, the thread portion 18 is characterized by a first pitch while thread portion 20 is characterized by a second and greater pitch. It will be observed, however, that the two thread portions 18 and 20 are portions of the same continuous thread 14, and the longitudinally intermediate portion 19 of thread between 18 and 20 suitably changes pitch in a gradual manner. The change in pitch will preferably be less than half the pitch of a female thread to be engaged thereby to lessen the possibility of complete reaming of the female thread.

Figure 2:
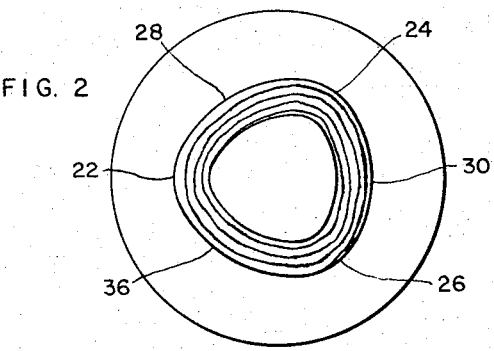

An end view of the thread is illustrated in FIG. 2, the thread cross sectional configuration being characterized by circumferentially spaced-apart lobes or protuberances 22, 24 and 26. The lobes have sloping sides, forming, or merging with, arcuate sides 28, 30, and 36 between the lobes wherein the lobes extend radially further outwardly than such arcuate sides. This thread configuration is of the same type described in my Patent 3,195,156, issued July 20, 1965, such thread having the advantage of relatively low driving torque as well as the advantage of relatively high stripping or failure torque as used for tapping or forming a female thread in a workpiece. The thread may also be described as being of arcuate, polygonal cross section, or, to be more specific in the case of the present illustration, of arcuate, triangular cross section. The fastener device of FIGS. 1 and 2 is suitably employed as a male member adapted for locking engagement with a female member which may also be formed of steel and which has been previously provided with an internal thread, similar, at least, to the thread at the work-entering portion of the thread on the fastener device. For example, such female member may be provided with a constant pitch thread which is substantially equal in pitch to the pitch of the thread portion 18 of fastener device 10. The fastener device 10 including thread portion 18 can then be driven with ease into such female member. However, as the fastener device is driven further into such member, interference takes place between the threads of such female member and the intermediate thread portion 19 as well as thread portion 20 of the fastener device, because of the difference of pitch between male and female threads, whereby to securely lock such fastener device and female member. In the fastener device according to the present invention, the sloping sides of successive lobes differ only slightly in pitch position from one to the next on the aforementioned longitudinally intermediate thread portion 19, for gradually reforming a thread in a female member and thereby preventing thread stripping or failure. The fastener device is preferably somewhat harder than the female member, but need not be. If the fastener device is softer, then it is reformed rather than the female member.

Figure 9:
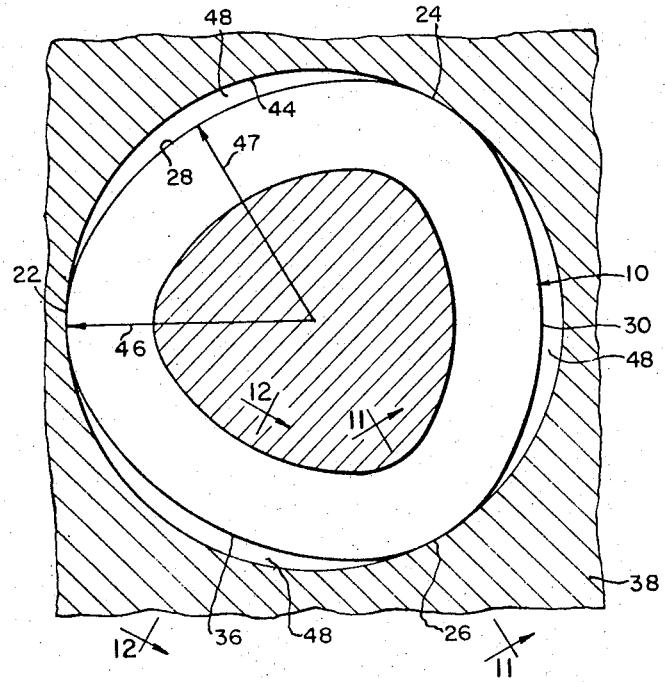
FIG. 9 is a schematic sectional view illustrating engagement in the FIG. 1 fastener device with a female member or workpiece.

The engagement of a threaded fastener device 10 with a female member 38 is more fully illustrated in cross section in FIG. 9. Here, the female member is provided with a threaded hole of conventional circular cross section having a circumference 44. The lobes 22, 24, and 26 of the fastener device are received in the female thread, such lobes having an outside radius 46 for threadably matching the thread in the female member. Radius 46 is somewhat greater than the fastener device's minimum radial dimension 47 at the arcuate sides intermediate the said lobes.

Figure 10:
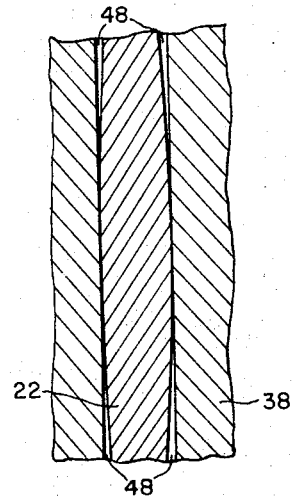
FIG. 10 is a fragmentary cross section illustrating thread engagement between a fastener device and a female member or workpiece taken at 10—10 in FIG. 11.

As will be noted, the relatively broad intermediate arcuate sides 28, 30, and 36 are thus supported out of immediate radial engagement with the root of the female member on account of the out-of-round condition of the fastener device, leaving voids 48 providing relief between the fastener device and the female member. FIG. 10, comprising a cross section of the thread engagement between a lobe 22 and a female member 38 taken at 10—10 in FIG. 11, also illustrates the presence of voids 48 where engagement between the two members is relieved. Because of this separation between the members during driving operation of the fastener device, frictional resistance between the fastener device and the female member is reduced.

As the fastener device is driven into locking engagement, that is, as the fastener device beyond thread portion 18 is driven into the female member, distortion of the female thread is likely to occur, e.g. tending to reform the thread in the female member, assuming the female member is softer. However, the sloping forward sides of lobes 22, 24, and 26 reform the female thread in a gradual manner. Each lobe in the fastener device thread differs only slightly in its pitch position from the previous lobe in the longitudinally intermediate region 19 of changing pitch, and consequently each such lobe reforms the female thread to only a limited extent without overstressing the threads in either member. Therefore, the threads in the female member are gradually reformed without rupture and without requiring excessive driving torque. The driving torque will be appreciably less than the stripping torque, and appreciably less than the torque that will cause fracture of the device. As a result, the fastener device can be driven by a power driver into a fully engaged position without danger of the application of excessive torque by such driver.

Figure 11:
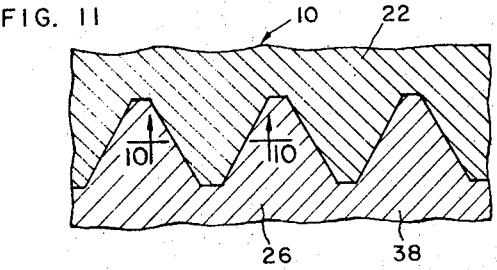
FIG. 11 is a longitudinal cross section illustrating threaded engagement at 11—11 in FIG. 9.
Figure 12:
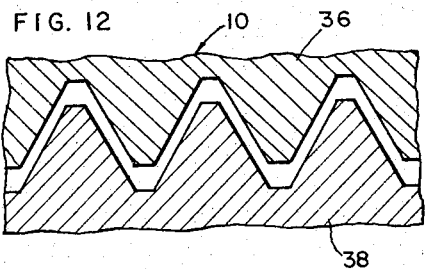
FIG. 12 is another longitudinal cross section illustrating threaded engagement at 12—12 in FIG. 9.
Figure 13:
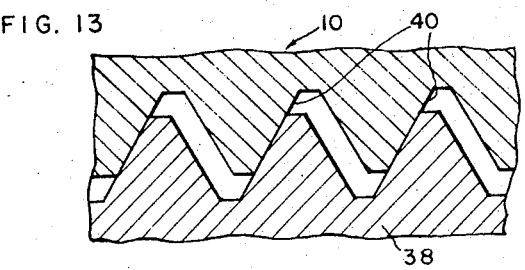
FIG. 13 is another longitudinal cross section showing threaded engagement at 12—12 in FIG. 9, for example, and at one end of a fastener device according to the present invention.
Figure 14:
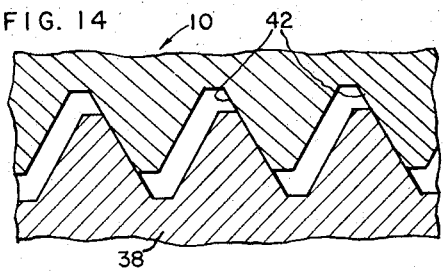
FIG. 14 is another longitudinal cross section showing threaded engagement at 12—12 in FIG. 9, for example, at the other end of a fastener device according to the present invention.

As the fastener device according to FIG. 1 is driven into a female member the thread portion 18 in the region of the lobes initially engages an internal thread of the female member as illustrated in FIG. 11. However, a longitudinal cross section at this time at an arcuate side is illustrated in FIG. 12. At the location of such arcuate sides, there is then no substantial initial flank contact between a male and female thread. As the fastener device is driven further into the female member, e.g. past threaded portion 18, the flanks of the fastener device thread tend to engage the internal threads of the female member, for example, in the region of the aforementioned arcuate sides. The flanks of the fastener device thread then engage the internal thread of the female member as indicated in FIGS. 13 and 14, illustrating longitudinal sections of thread engagement. The thread portion 18, in the arcuate side region, is compressed longitudinally inwardly into the female member as illustrated in FIG. 13, where flanks 40 on fastener device 10 bear upon the female member thread. On the other hand, the thread portion 20 in the arcuate side region illustrated in FIG. 14, when engaged, will press on the thread of the female member in the opposite direction, i.e. at flanks 42. A locking action is thereby produced between the male and female members. Of course, in the region of the lobes, relatively more complete contact occurs from the time of initial engagement, and reforming of the female threads therefore takes place as a fastener device thread of changing pitch engages the same. However, here also the threads of the fastener device axially bear against the female member oppositely at thread portions 18 and 20. As the female threads are reformed, this locking engagement of oppositely bearing threads continues to be established and maintained.

The configuration of thread in the embodiment of FIGS. 1 and 2 may also be advantageously employed to tap or form an initial thread in the female member or workpiece. The fastener device is, of course, desirably at least somewhat harder than such female member and the shank of the fastener device is tapered at its tip end 13. A female member or workpiece may be provided with a pilot hole adapted to receive such tip end as well as the beginning threads provided on the tapered portion of the fastener device shank. The thread on the fastener device may then be driven into the pilot hole to swage a mating thread in the female member or workpiece. The fastener device lobe portions, which extend further outwardly, do the swaging, so the fastener device is relatively easy to drive. As the fastener device is driven more deeply, so that the female member receives thread portions 19 and 20, a thread having a different pitch will now tend to be swaged in the female member. The driving torque is, however, minimized as in the case where the fastener device is employed with a female member having a preformed thread.

Figure 3:
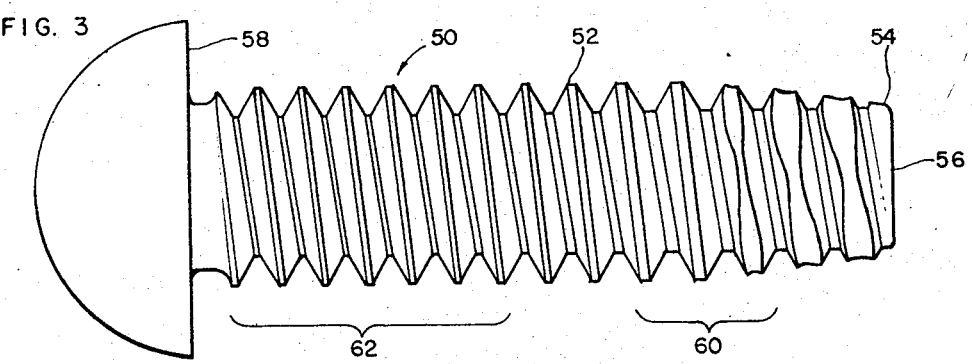
Figure 4:
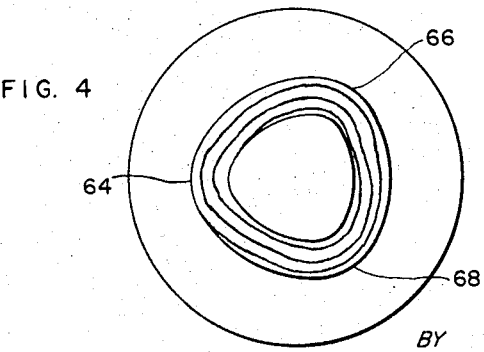

Another embodiment of the invention is illustrated in FIGS. 3 and 4. In this embodiment a fastener device 50 includes thread 52 provided on shank 54, the shank being tapered to the tip end at 56. The fastener device is also provided with a head 58 at the opposite end thereof. Thread 52 includes a first portion 60 proximate the work-entering end of the device and a second portion 62 longitudinally removed therefrom towards head 58. This embodiment of the fastener device differs from the previous embodiment in that thread portion 60 has a greater pitch than thread portion 62, rather than vice versa.

Assuming the fastener device of FIGS. 3 and 4 is driven into a female member having an internal thread matching the pitch of thread portion 60, an initially free engagement is established therebetween. However, as the fastener device is driven further into the female member, such that thread portion 62 engages the same, a locking condition takes place. The situation may again be illustrated by FIGS. 13 and 14, but wherein the representation of the longitudinally separated thread portions is reversed. In this embodiment, the rearward flanks of thread portion 60 will bear against the female member as indicated in FIG. 14 while the forward flanks of thread portion 62 will bear against the threads of the female member as illustrated in FIG. 13. The cross section of the fastener device is again arcuately polygonal with circumferentially spaced-apart lobes 64, 66, and 68 as illustrated in FIG. 4.

A further embodiment of the present invention is illustrated in FIGS. 5 and 6 wherein fastener device 70 includes a thread 72 formed upon shank 74 thereof. In this embodiment, the pitch of the thread 72 substantially continuously increases from the entering end thereof to the last convolution proximate head 76. Thus, in this embodiment, a matching internal thread of constant pitch in the female member does not really exist. Assuming the thread in the female member has a pitch approximating the pitch of the thread of the fastener device at its entering end, then continually increasing interference will take place between the male and female threads as the fastener device is driven into the female member, thus producing locking of the subject members. Although the thread is illustrated in this embodiment as increasing in pitch from the work-entering end in a manner similar to the embodiment of FIGS. 1 and 2, threads 72 may alternatively decrease in pitch from the work-entering end in a manner similar to the embodiment of FIGS. 3 and 4. Again, the configuration of the device is arcuately polygonal as illustrated in FIG. 6.

When one of the fastener devices according to the present invention is driven well into a female member already provided with a tapped internal thread, or in the case where the fastener device of the present invention initially forms such thread, such thread will tend to be reformed not only when the fastener device is driven into locking position, but also each time the fastener device is removed or unscrewed from the female member. The thread on the female member must usually be reformed at least to some degree in order to extricate the fastener device inasmuch as, in the driving operation, metal will have been swaged into the position of the original thread in the female member, thus blocking removal of the fastener device. Therefore, when the fastener device is driven into the workpiece or female member, such that a thread portion of substantially different pitch fully engages such workpiece or female member, the locking condition therewith will be well established.

Also, it is possible to employ the fastener device according to the present invention with the female member having a slightly differently pitched thread than the thread on the work-entering end of the fastener device. In the latter case, the internal thread in the female member is reformed by the work-entering end thread on the fastener device and reformed again when a second thread portion is encountered. Of course, it may be reformed once more when the fastener device is removed.

Thread portions on two longitudinally-spaced locations on a fastener device have been described with respect to the foregoing embodiments, wherein interference is established with a female member because of a difference in pitch of the thread of the female member and the fastener device thread at such locations. However, other thread configurations may also provide the desired interference in accordance with the present invention. The desired interference is established so long as the flanks of the fastener device's continuous thread at the longitudinally spaced-part portions bear upon an engaged thread in longitudinally opposite directions. In order for such engagement to take place, the thread at one longitudinally spaced thread portion must vary from what would be a constant pitch extension of the thread at the other longitudinally spaced thread portion. The thread at a first longitudinally spaced thread portion may even have the same pitch as the thread at the second longitudinally spaced thread portion but must not constitute a mere extension of the second. The thread at a first longitudinally spaced thread portion must be longitudinally displaced somewhat with respect to an imaginary constant pitch projection or continuation of the thread at the other portion. A fastener device meeting this criterion can include two longitudinally spaced portions of similar pitch with an intermediate portion of a somewhat different pitch, either greater or less than the pitch of the spaced portions, so as to longitudinally displace the thread of one spaced portion with respect to what would be an extension of the other, to provide the desired flank engagement. Such a fastener device is illustrated at 100 in FIGS. 7 and 8 wherein longitudinally spaced thread portions 102 and 104 have substantially the same pitch while an intermediate thread 106 has a slightly different pitch, here a larger pitch, in order to longitudinally displace the threads at 102 and 104. In the case of this embodiment, as in the case of the previous embodiments, the flanks of the thread at the spaced-apart portions thus bear upon an engaged internal thread of initially constant pitch in longitudinally opposite directions. The criterion of longitudinal displacement of one spaced thread portion with respect to what would be a constant pitch helix extension of the other is, of course, also met by fastener devices according to the previously described embodiments.

While I have shown and described several embodiments of my invention, it will be apparent to those skilled in the art that many changes and modifications may be made without departing from my invention in its broader aspects. I therefore intend the appended claims to cover all such changes and modifications as fall within the true spirit and scope of my invention.

I claim:
1. A threaded fastener device for use with a female member with which said fastener device is to be connected in locking relation, said fastener device being adapted for securing a third member to said female member, said female member being formed with a thread initially matching the thread on the work-entering end of the fastener device, the fastener device, including the crest and root of the threads thereon, being of arcuate, triangular cross section including circumferentially spaced-apart lobes, the crest of said lobes extending outwardly by a greater distance from the axis of said fastener device than the crest of the thread portions circumferentially intermediate said lobes, said lobes merging smoothly and gradually with the thread portions of said fastener device circumferentially intermediate said lobes to provide said lobes with sloping sides, the work-entering end of said fastener device having a thread portion characterized by a first pitch, and a second portion longitudinally removed along said fastener device from said work-entering end wherein the thread is characterized by a pitch substantially different from said first pitch, so that flanks of the thread on said fastener device at the work-entering end and at said longitudinally removed portion will be urged into oppositely directed engagement with the thread in said female member for locking said fastener device with said female member, the thread on said fastener device being provided with a longitudinally intermediate portion between said work-entering end and said longitudinally removed portion, said longitudinally intermediate portion having a gradually changing pitch for completing a substantially continuous thread on said fastener device, the circumferentially spaced-apart lobes on said longitudinally intermediate portion differing only slightly in pitch position from one to the next for gradually reforming a thread in said female member, the reformed thread on said female member further locking said fastener device in full engagement with said female member.

References Cited
UNITED STATES PATENTS

| | | | |
|---|---|---|---|
| 197,467 | 11/1877 | Harvey | 151—22 |
| 2,356,098 | 8/1944 | Steinle et al. | 151—22 |
| 3,249,142 | 5/1966 | Phipard | 151—22 |

FOREIGN PATENTS

| | | |
|---|---|---|
| 17,482 | 8/1908 | Great Britain. |

RAMON S. BRITTS, *Primary Examiner.*